Dec. 8, 1942.　　　　R. P. HEUER　　　　2,304,170
FURNACE ROOF
Filed June 24, 1939　　　2 Sheets-Sheet 1
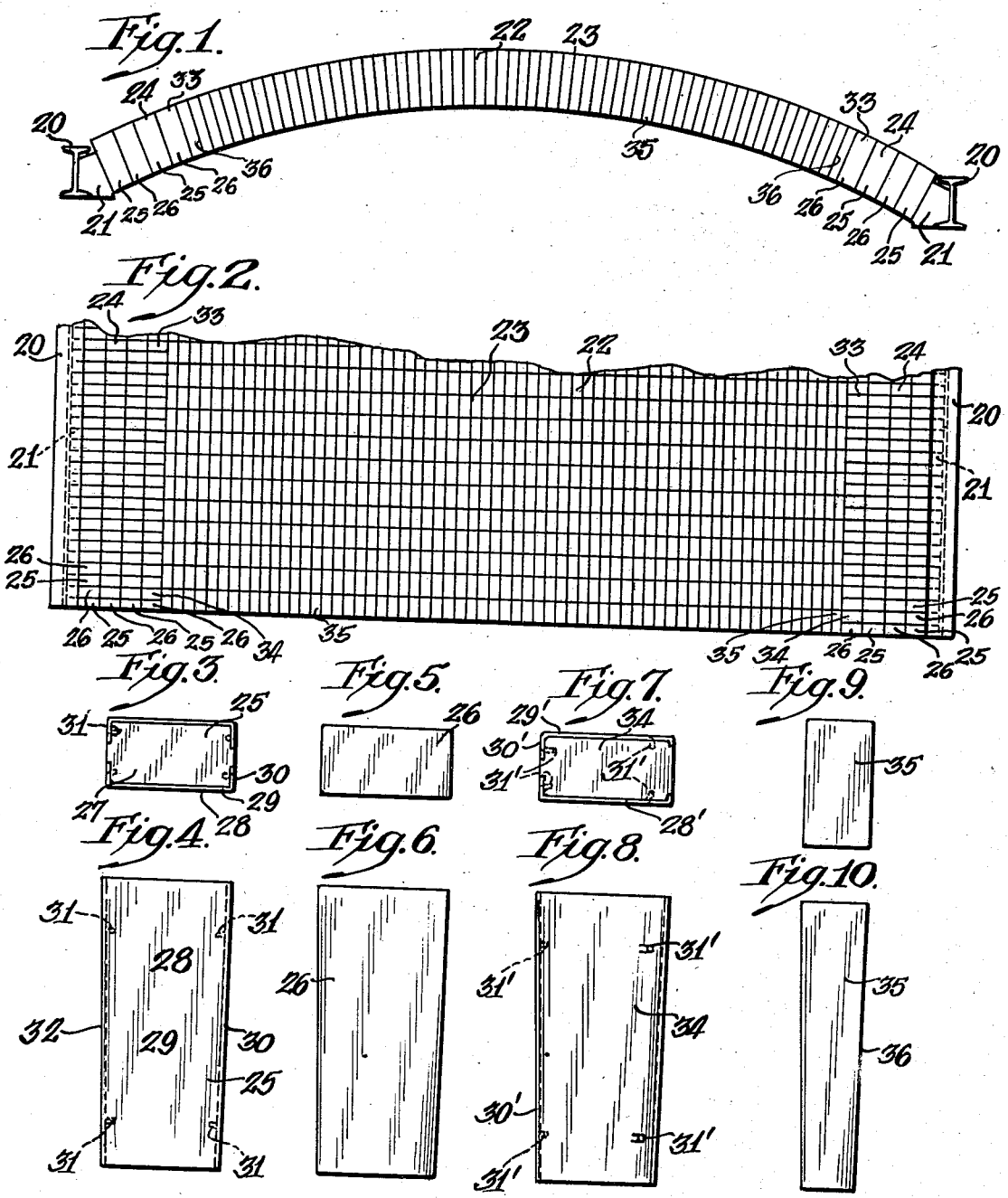

Dec. 8, 1942.  R. P. HEUER  2,304,170
FURNACE ROOF
Filed June 24, 1939  2 Sheets-Sheet 2
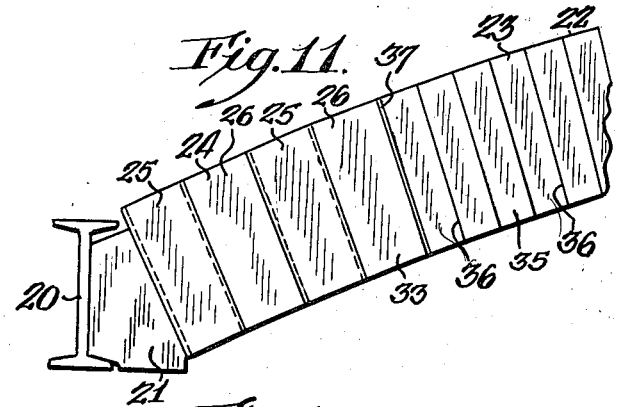
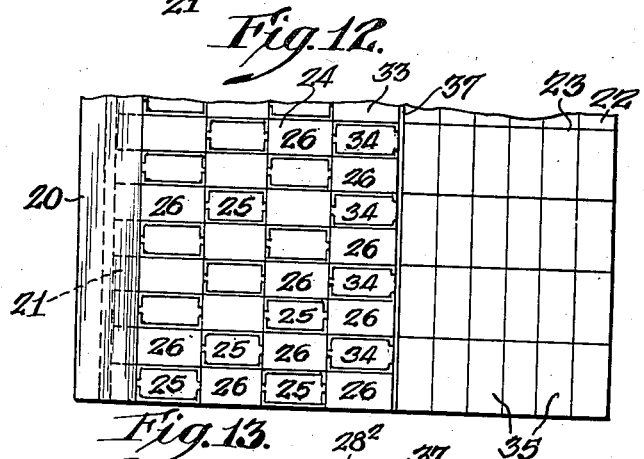
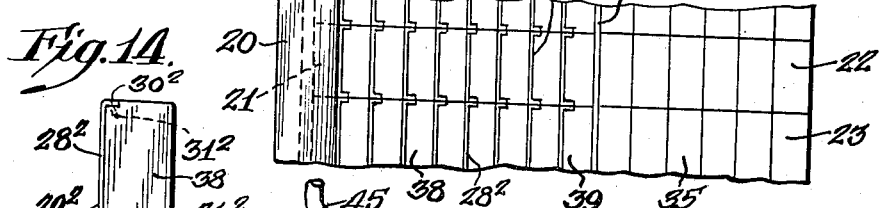
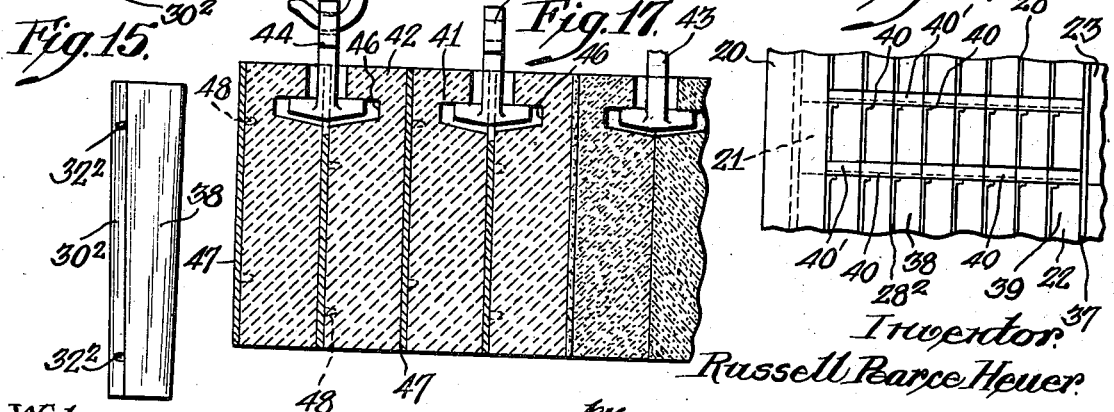
Inventor
Russell Pearce Heuer
Attorneys Patented Dec. 8, 1942

2,304,170

UNITED STATES PATENT OFFICE 2,304,170

FURNACE ROOF

Russell Pearce Heuer, Bryn Mawr, Pa., assignor, by mesne assignments, to Harbison-Walker Refractories Company, Pittsburgh, Pa., a corporation of Pennsylvania Application June 24, 1939, Serial No. 280,958

8 Claims. (Cl. 110—99)

My invention relates to furnace roofs, particularly roofs of metallurgical furnaces such as open hearth steel furnaces and copper smelting furnaces.

A purpose of my invention is to prolong the lives of furnace roofs consisting chiefly of acid bricks by employing non-acid brick shoulders suitably provided with oxidizable metallic spacer plates.

A further purpose is to build the roof of a metallurgical furnace, such as an open hearth steel furnace or a copper smelting furnace, of a sprung arch of acid bricks having, adjacent the skewbacks, shoulders which consist of non-acid bricks provided with oxidizable metallic spacer plates.

A further purpose is to construct a furnace roof in arch form chiefly from acid bricks, with shoulders at the ends of the arch consisting of non-acid bricks, the non-acid bricks being provided with oxidizable metallic spacer plates at some or all of their adjoining faces but the metallic spacer plates being substantially or entirely omitted at the faces of the non-acid bricks adjoining the acid bricks.

A further purpose is to interpose a layer of substantially chemically neutral material between acid bricks of an arch and non-acid shoulders of said arch, while integrating the basic bricks by oxidizable metallic spacer plates.

Further purposes appear in the specification and in the claims.

Refractory bricks for furnace arches are available in such a multitude of different shapes that it is impossible to illustrate all of the shapes in which such bricks might be employed. No attempt has been made to do so.

Describing in illustration and not in limitation and referring to the drawings:

Figure 1 is a side elevation of a sprung arch roof of a metallurgical furnace such as an open hearth steel furnace.

Figure 2 is a fragmentary top plan view of the construction of Figure 1.

Figure 3 is a top plan view of a non-acid brick provided with metallic spacer plates, and intended to be employed in one of the non-acid shoulders of Figures 1 and 2.

Figure 4 is a front elevation of the brick of Figure 3.

Figure 5 is a top plan view of a non-acid brick which lacks the oxidizable metallic spacer plates and is intended to be used alternately with the brick of Figures 3 and 4.

Figure 6 is a front elevation of the brick of Figure 5.

Figure 7 is a top plan view of a special non-acid brick with oxidizable metallic plates, said brick being intended for placement at the portion of the shoulder which adjoins the acid brick.

Figure 8 is a front elevation of the brick of Figure 7.

Figure 9 is a top plan view of an acid brick as used in Figures 1 and 2.

Figure 10 is an end elevation of the brick of Figure 9.

Figure 11 is an enlarged fragment of Figure 1, differing from Figure 1 in that it illustrates a layer of neutral cement between the non-acid shoulders and the acid brick section, said cement being absent in Figure 1.

Figure 12 is a fragmentary enlargement of Figure 2, but employing the neutral cement shown in Figure 11.

Figure 13 is a variation shown in fragmentary top plan view, the shoulder bricks being wedge rather than key bricks.

Figure 14 is a top plan view of one of the basic bricks of Figure 13.

Figure 15 is an end elevation of the brick of Figure 14.

Figure 16 is a fragmentary top plan view showing a variation of the form of Figure 13.

Figure 17 is a fragmentary section of a further variation of the invention.

In the drawings similar numerals indicate like parts.

For many years open hearth steel furnaces and other metallurgical furnaces have been provided with sprung arch roofs of acid brick. Such acid brick are ordinarily made of silica and have the advantage of production at low cost and of possessing the physical properties, particularly high crushing strength and spalling resistance at operating temperature which permit their use in sprung arches.

More recently considerable increase in the lives of the roofs of metallurgical furnaces has been obtained by constructing such roofs of suspended non-acid bricks provided with oxidizable metallic spacer plates. The spacer plates oxidize adjacent the hot faces of the bricks, grow and integrate the bricks to one another. Examples of such suspended furnace roofs are shown in my United States Patent No. 2,154,813, for suspended furnace roof, and No. 2,155,165, for furnace roof, both granted April 18, 1939. The former patent describes a suspended furnace roof of non-acid bricks such as chrome or magnesia, and provided with oxidizable metallic spacer plates. The latter patent illustrates such a roof construction employing chrome-magnesia bricks.

Efforts to obtain non-acid sprung arches of substantial size have met with difficulty due to the low crushing strength of non-acid bricks at furnace operating temperature and the tendency of arches of non-acid brick to fail through crushing or spalling. I have discovered that the lives of silica roofs, particularly silica sprung arches of the type heretofore generally used in metallurgical furnaces such as open hearth steel furnaces, may be prolonged by the use of shoulders consisting of non-acid bricks.

In this way the advantage of the great cheapness of the acid bricks is obtained, since only a comparatively small part of the arch need consist of the more expensive non-acid bricks, while on the other hand the disadvantage of short life of the silica sprung arch is in part overcome. Of course, the silica arch with non-acid shoulders does not have a life equal to that of the suspended non-acid roof with oxidizable metallic spacer plates, but the investment in the former is much lower, and for some installations, therefore, the much cheaper acid roof with non-acid shoulders provided with oxidizable metallic spacer plates may be used with economy.

It has been found that non-acid bricks will stand up in the shoulders especially when integrated by the oxidizable metallic spacer plates. The central part of the arch, when made of acid bricks in accordance with the present invention, does not exhibit a pronounced tendency to spall, and so a progressive spalling effect proceeding from the center to the outside edges as sometimes seen in an arch consisting entirely of non-acid bricks, is not found in the arch of the present invention and the spalling tendency does not make itself felt at the basic shoulders, or at least not early enough in the life of the roof to be objectionable.

In the roofs of the prior art consisting entirely of silica, failure has frequently occurred at the shoulders due to fluxing caused by basic oxides present in the furnace as for example iron oxide, copper oxide, lime or the like. These basic oxides attack the silica brick and cause them to fuse and slowly melt away. In many furnaces it is found that the silica brick in the ends of the arch near the skewbacks are destroyed most rapidly, thus requiring that these areas be renewed whilst brick in the center of the arch are still good for further use. The non-acid shoulders of the present invention have to a considerable extent overcome this difficulty, since the non-acid shoulders with oxidizable metallic spacer plates resist the attack of the basic oxides more readily than do the acid shoulders of the prior art. The superior resistance of the non-acid shoulders is particularly evident in the basic open hearth steel furnace, although also evident in copper smelting furnaces and other metallurgical furnaces.

Thus in the silica sprung arch of the present invention, with non-acid shoulders provided with oxidizable metallic spacer plates, the refractory user obtains the economy of the silica arch along with increased life due to maintenance of the shoulders beyond the life of silica shoulders.

The preferred form of the invention is illustrated in Figures 1 to 12, the modification of Figures 11 and 12 desirably being employed.

The roof is supported from any suitable permanent construction, here conventionally illustrated by beams 20. The sprung arch rests upon skewbacks 21 of any suitable material, preferably non-acid refractory material although permissibly metal. Where metal skewbacks are used, water cooling, not shown, will be provided as well known in the art.

The roof arch 22 consists of an acid main roof section 23 and one or more non-acid shoulders 24. The shoulders are at the edge of the arch adjoining the skewbacks 21 and extend for a distance which will be variant with individual roofs. Suitably each shoulder may be about fifteen per cent of the length of the arch.

The shoulders consist of non-acid brick provided preferably with oxidizable metallic spacer plates. The spacer plates may be wholly or partially attached to the bricks or wholly or partially free from the bricks at the time of installation. It is preferred to employ spacer plates which are secured to the bricks by placing the spacer plates in the brick molds and molding the brick mix within the spacer plates as described in my United States patent application Serial No. 198,426, filed March 28, 1938, for Refractory brick process, machine and structure and my United States patent application Serial No. 238,505, filed November 3, 1938, for Refractory brick structure. In the preferred form the bricks 25 provided with the oxidizable metallic spacer plates alternate with the bricks 26 which are wholly free from spacer plates so that at no point in the shoulders will there be more than one thickness of spacer plate between the refractory of any two bricks. The non-acid bricks 25 and 26 alternate not only lengthwise of the arch, but also in the direction of depth of the arch parallel with the skewbacks.

The non-acid bricks 25 (Figures 3 and 4) consist of a non-acid refractory body 27 and U-shaped spacer plates 28, the base 29 of the U extending over the side face of the brick and the arms 30 extending over a portion of the end face of the brick. Suitable prongs 31 are desirably stamped from the arms 30 and embedded into the refractory body 27 during the molding. In side elevation the bricks 25 are tapered at 32 as shown in Figure 4, the external contours desirably conforming to those of "key" bricks as well known in the prior art.

The oxidizable metallic spacer plates as used in the present invention are desirably of iron or steel in sheet form. The thickness may vary, but will ordinarily be between one-thirty-second and one-eighth of an inch. Good results have been obtained using spacer plates about one-sixteenth inch thick. An excess thickness of metal is not desirable since the metal upon oxidizing will develop an oxide layer about twice as thick as the original metal thickness. Excessive growth of the metal layer in the brick work joints may cause the ends of the brick to be pinched off because of the expansion.

The spacer plates should not collapse laterally under pressure, and for this reason a single thickness of sheet metal should be employed, in the best embodiment.

The non-acid bricks 26 (Figures 5 and 6) are in external contour desirably identical with the bricks 25 but are entirely unprovided with oxidizable metallic spacer plates. The bricks 26 may be identical with "key" bricks of the prior art.

The innermost non-acid bricks 33 which adjoin the acid (silica) bricks of the main arch section 23 desirably consist of special bricks 34 (Figures 7 and 8) alternating with standard key bricks 26 in the direction of depth of the arch. The special bricks 34 are identical with the bricks 25 except that the arm 30 on the spacer plate is substantially or entirely omitted at one end of the brick. The oxidizable metallic spacer plates 28' thus consist of a base portion 29' and a single arm 30' with suitable prongs 31' embedded in the refractory during the molding.

The acid bricks making up the main section of the refractory roof are conventional wedge bricks 35 having their long horizontal cross sectional dimensions in the direction of depth of the arch and their short horizontal cross sectional dimensions lengthwise of the arch, with suitable tapering at 36 on the broad faces. There are, of course, no metallic plates between or in contact with any of the acid bricks, since the metallic oxide (iron oxide) of the spacer plates would react with the acid bricks.

In Figures 1 and 2 no separating layer is provided between the non-acid bricks and the acid bricks. It has been found experimentally that the amount of reaction between the non-acid and acid bricks at this point is very small provided the spacer plates are omitted on the face of the non-acid bricks which adjoins the acid bricks. It is, however, decidedly preferable to separate the non-acid bricks from the acid bricks by a layer of relatively non-reactive material. Accordingly, in Figures 11 and 12 a layer 37 of neutral cement is shown. The so-called neutral cement used may be produced in accordance with my United States Patent No. 1,714,506, granted May 28, 1929, for Brick and cement for furnace use. I find that a layer of cement having a thickness of about one-quarter inch is entirely satisfactory, but the thickness of the layer is not critical.

The non-acid bricks used in the shoulders may be of any suitable non-acid refractory brick composition. The bricks may be what are ordinarily and commercially known as magnesite (dead burned magnesite, periclase or magnesia) bricks, or chrome bricks or magnesite-chrome bricks or chrome-magnesite bricks. Suitable brick compositions are described in my United States Patents No. 2,155,165, granted April 18, 1939, for Furnace roof; No. 2,154,813, granted April 18, 1939, for Suspended furnace roof; No. 2,087,107, granted July 13, 1937, for Chrome-magnesia refractory and method; No. 1,992,482, granted February 26, 1935, for High-pressure brick containing magnesia, and process of making the same; No. 1,992,483, granted February 26, 1935, for High pressure chrome refractory; No. 1,851,181, granted March 29, 1932, for Dense mix for refractories and process of preparing the same; No. 1,859,512, granted May 24, 1932, for Refractory and method of making it; and No. 1,845,968, granted February 16, 1932, for Chrome refractory and its method of manufacture. All of the patents mentioned in this paragraph are incorporated herein by reference and made a part hereof.

The form of Figures 1 to 12 shows "key" bricks in the shoulders. The arch bricks in which the smaller lateral faces are not parallel are known in the art as "key" bricks. This form is prefered because the shoulder bricks more strongly resist crushing lengthwise of the arch when the major horizontal dimension (usually 6 inches) is placed lengthwise than when the minor horizontal dimension (usually 3 inches) is placed lengthwise. However, those engaged in assembling the roof usually find it more convenient to use shoulder bricks in which the major horizontal dimension is placed in the direction of depth of the arch, and therefore the shoulder bricks may be of the standard "wedge" shape.

Figures 13, 14 and 15 show such wedge bricks 38, each of which has on one face and part of the adjoining ends an oxidizable metallic spacer plate $28^2$ of general U shape, the base $29^2$ of the U covering one of the tapered sides of the brick and arm portions $30^2$ covering parts of the ends, with suitable prongs $31^2$ embedded in the brick. If desired, a flat plate in which the arm portions $30^2$ are not present may be used.

The bricks 38, carrying as they do the oxidizable metallic spacer plate on only one side, are placed desirably with the spacer plates of the outside bricks contacting the skewback and the uncovered side of each brick facing inwardly. This insures that on the face of the innermost non-acid brick 39 which adjoins the acid bricks, no spacer plate is present.

In the construction shown in Figure 16, oxidizable metallic spacer plates 40 having top flanges 40' are provided between the non-acid bricks. Otherwise the construction is identical with that of Figure 13. The plates 40 are merely loose pieces cut and formed to the proper shape which are inserted between individual brick as shown when the roof is built. The purpose of the top flanges 40' is to keep the loose plates in their proper position.

The type of plate construction where one U-shaped plate as shown in Figure 13 or a flat plate without the arms $30^2$ is applied to a wedge brick may also be applied to the key brick shown in Figure 12. The plate in this case is attached to one major face of the brick. A loose plate similar to 40 may be used in contact with the adjoining face of the brick if desired.

Figure 17 shows a suspended roof 41 having a shoulder portion 42 of non-acid bricks and a main roof section 43 of acid bricks. The bricks are supported by hanger construction conveniently illustrated by hangers 44 suspended by overhead structure 45. The hangers 44 engage in hanger pockets 46. The non-acid bricks are provided with oxidizable metallic spacer plates 47, desirably molded in place on the bricks and interlocked to the bricks as by prongs 48 embedded in the bricks.

It is believed that the invention offers less advantage in suspended roofs than in sprung arches, particularly as suspended roofs are usually horizontal and the local corroding action experienced adjacent the skewback in a curved sprung arch is, therefore, not exhibited in a suspended roof.

The silica roof of the present invention with non-acid shoulders was installed in Canada at the instance of the present inventor and used with success. One of such installations has been described in the Engineering and Mining Journal, December, 1933, page 541 and in the Canadian Mining and Metallurgical Bulletin, No. 281, September, 1935, particularly pages 412 to 418. Another installation is described in the Canadian Mining Journal, November, 1937, page 675. These descriptions did not mention the chrome-magnesia character of the non-acid bricks nor the metal plates between these bricks.

In operation, the roof is first assembled in any one of the forms of the invention. The furnace is then put in operation, and, due to the action of the gases of combustion of the furnace, the spacer plates adjoining the hot face and for a distance back of the hot face are oxidized. This oxidation causes the spacer plates to grow, since the oxide occupies a larger body than the original metal. The growth compensates for shrinkage of the bricks, which is particularly pronounced in non-acid bricks especially those which have not been fired prior to installation in the furnace. In the construction of the present invention it is preferred to employ unburned bricks that is, bricks which have been made without firing in a kiln. The oxidized spacer plates not only penetrate irregularities in the faces of both adjoining bricks, thus sealing against escape of furnace gases, but also apparently undergo a chemical reaction, possibly forming magnesio-ferrite, and integrating non-acid refractory bricks together. Under the integrating influence of the spacer plates, the non-acid shoulders of the arch remain in place and are not destroyed until considerably after silica shoulders would have failed.

As already explained, particularly in a curved or arched construction, the shoulders receive molten material flowing down on the inside from the top of the arch. The non-acid shoulders resist the corrosive action of this foreign matter more effectively than silica shoulders.

It will be evident that by the present invention, the major difficulty of the silica roof is avoided, that is, its short life, while its primary advantage, that of low cost, is in large measure retained. It is thus possible to obtain a prolonged life of the roof without going to the expense of installing a suspended basic arch with oxidizable metallic spacer plates, although, of course, without obtaining the very long life which is obtained from the basic suspended roof with oxidizable metallic spacer plates.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a furnace roof arch, a section exposed to the furnace interior covering the main area of the arch and consisting of acid refractory bricks, a shoulder exposed to the furnace interior at one edge of the arch consisting of non-acid refractory bricks extending for the full thickness of the refractory at the shoulder and oxidizable metallic spacer plates between non-acid refractory bricks of the shoulder, the spacer plates being substantially omitted at the faces of the non-acid bricks which adjoin the acid bricks.

2. In a furnace roof arch, an arch section exposed to the furnace interior covering the major portion of the area and consisting of acid refractory bricks, a shoulder exposed to the furnace interior at one edge of said acid refractory brick section consisting of non-acid refractory bricks extending for the full thickness of the refractory at the shoulder, oxidizable metallic spacer plates between non-acid refractory bricks of the shoulder and a layer of neutral cement between the acid brick section and the non-acid brick shoulder.

3. In a basic open hearth steel furnace, a suspended roof having a portion exposed to the furnace interior and consisting of suspended silica refractory bricks and having another portion exposed to the furnace interior and having its full vertical cross section consisting of suspended non-acid refractory bricks which are resistant to material corrosion attack by dust particles in the furnace atmosphere.

4. A refractory sprung arch having a center portion exposed to the furnace interior and consisting of acid refractory bricks and having shoulders exposed to the furnace interior on either side of the center portion consisting of non-acid refractory bricks and oxidizable metallic spacer plates between non-acid refractory bricks of the shoulders, the spacer plates being substantially omitted on the faces of the non-acid refractory bricks adjoining the acid refractory bricks, and the non-acid refractory bricks and the plates bearing the entire load of the arch.

5. An open hearth steel furnace sprung arch roof having a central section exposed to the furnace interior and consisting of acid refractory bricks, shoulders exposed to the furnace interior on either side of the central section consisting of non-acid refractory bricks and oxidizable metallic spacer plates between non-acid bricks of the shoulders, said spacer plates being substantially out of contact with the acid bricks, and the non-acid refractory bricks and spacer plates bearing the full load on the arch.

6. A refractory sprung arch roof having a central section of wedge bricks set wedge-wise and shoulders of key bricks set key-wise on either side of the central section.

7. In a refractory sprung arch, a central section consisting of wedge acid bricks set wedge-wise and shoulders consisting of key non-acid bricks set key-wise on either side of the wedge acid bricks.

8. In a suspended furnace roof, a section covering one portion of the furnace chamber and consisting of suspended acid refractory bricks and a section covering another portion of the furnace chamber adjoining the acid refractory bricks and consisting of suspended non-acid refractory bricks extending for the full vertical thickness of the refractory roof at the location of the non-acid refractory bricks, and oxidizable metallic spacer plates between non-acid refractory bricks on said edge section.

RUSSELL PEARCE HEUER.